United States Patent [19]

Walsh et al.

[11] Patent Number: 4,469,763

[45] Date of Patent: Sep. 4, 1984

[54] LITHIUM OXYHALIDE BATTERY WITH CATHODE CATALYST

[75] Inventors: Fraser Walsh, Arlington; R. Scott Morris, Fairhaven, both of Mass.

[73] Assignee: Tracer Technologies, Inc., Newton, Mass.

[21] Appl. No.: 544,244

[22] Filed: Oct. 21, 1983

[51] Int. Cl.³ ............................................. H01M 6/16
[52] U.S. Cl. .................................. 429/101; 429/194; 429/198; 429/197
[58] Field of Search ............... 429/101, 194, 196, 197, 429/198, 218, 199

[56] References Cited

U.S. PATENT DOCUMENTS 3,567,515  3/1971  Maricle et al. ................. 429/196 X
4,252,875  2/1981  Venkatasetty ....................... 429/196
4,296,185  10/1981  Catanzarite ........................... 429/48
4,355,086  10/1982  Saathoff et al. ..................... 429/105
4,366,212  12/1982  Dey et al. ........................... 429/101

FOREIGN PATENT DOCUMENTS 3122080  3/1982  Fed. Rep. of Germany .

Primary Examiner—Anthony Skapars
Attorney, Agent, or Firm—Kenway & Jenney

[57] ABSTRACT

In a lithium oxyhalide battery having an anode containing lithium, calcium or a combination thereof, a non-aqueous electrolyte containing an oxyhalide such as thionyl chloride, sulfuryl chloride or phosphorous oxychloride and a cathode, the improvement comprising:
(a) addition of a tetraaza-[14]-annulene complex to the cathode.

15 Claims, 3 Drawing Figures

LITHIUM OXYHALIDE BATTERY WITH CATHODE CATALYST

BACKGROUND OF THE INVENTION

This invention relates to a lithium oxyhalide cell or primary battery system with a cathode catalyst that provides the system with a significantly improved discharge rate and discharge capacity.

The recent growth in portable electronic products has produced a demand for light electrochemical power sources with a high rate of discharge and a high energy storage capacity. This demand has created much interest in lithium cells and batteries. A lithium cell refers to an electrochemical cell using a highly reactive, yet light, lithium anode, in combination with various cathode and electrolyte materials. The interest in this cell technology stems from a recognition that such cells can theoretically provide higher energy densities and higher voltages than conventional cells.

Lithium cells consist of a light, highly reactive anode containing lithium, an active cathode depolarizer, an ionically conductive electrolyte, and a cathode current collector. Liquid oxyhalides of an element of Group V or Group VI of the Periodic Table function as both active cathode depolarizers and electrolyte solvents. Oxyhalides such as phosphoryl chloride, vanadyl trichloride, vanadyl tribromide, thionyl bromide, thionyl chloride, sulfuryl chloride, pyrosulfuryl chloride, chromyl chloride, selenium oxychloride, and selenium oxyfluoride when included in cells, result in cells with high energy density and current delivery capability, especially in conjunction with a stable lithium complex such as lithium aluminum tetrachloride.

It should be understood that of the foregoing list of oxyhalides used in lithium cells, lithium-thionyl chloride, lithium-sulfuryl chloride and lithium-phosphorous chloride have been employed more frequently in commercial applications. Thus, when reference is made to either lithium-thionyl chloride, lithium-sulfuryl chloride, or lithium-phosphorous chloride, it is to be understood that any other liquid "oxyhalide" is an equivalent.

Prior lithium oxyhalide batteries suffer from poor long term storage capability following high rate discharge and from a lack of safety. During high rate discharge, unstable chemical reaction species are formed at the anode and reaction products such as lithium chloride are deposited on the cathode. As the internal resistance rises, overheating occurs and there is a risk of explosion.

Methods to increase the discharge rate capability and decrease formation of reaction products on the electrodes include the addition of a phthalocyanine complex to the cathode, use of a corroding cathode, and addition of $AlCl_3$ and butyl pyridinium chloride to the electrolyte solution.

U.S. Pat. No. 4,252,875 entitled Electro-Catalysts For the Cathode(s) To Enhance Its Activity to Reduce $SOCl_2$ in $Li/SOCl_2$ Battery by Hanumanthiya V. Venkatasetty teaches improving the discharge rate of oxyhalide systems by applying a coating of phthalocyanine complex on the cathode. However, these complexes tend to dissolve into the electrolyte thereby reducing their usefulness.

U.S. Pat. No. 4,366,212 entitled Non-Aqueous Cell With Fluid Cathode Depolarizer and Corrodible Cathode by Dey et al. teaches that use of a cathode, corrodable by the electrolyte solvent at the same rate at which deposits are made onto the cathode, prevents a decrease in discharge rate. The disadvantage is that the cathode and the fluid cathode depolarizer/electrolyte solvent must be maintained separately until the battery is used since the cathode degrades following exposure to the solution.

U.S. Pat. No. 4,355,086 entitled Lithium Thionyl Chloride Battery by Saathoff et al teaches improving the discharge rate and decreasing the chance of overheating by increasing the conductivity of the electrolyte solvent through the addition of highly conductive acidic salt mixtures. This scheme does not eliminate the problem of deposition of lithium chloride on the cathode with subsequent loss of discharge rate capacity.

U.S. Pat. No. 4,296,185, discusses a possible solution to long term storage of lithium oxyhalide batteries. This patent is based on an alternative theory that the build-up of compounds on the anode causes a decrease in current rate delivery after storage ("passivation").

It is therefore apparent that lithium oxyhalide systems would be particularly suitable for many applications if the rate of discharge and discharge capacity could be improved.

SUMMARY OF THE INVENTION

An object of this invention, therefore, is to provide a lithium-oxyhalide system that has an improved discharge rate and discharge capacity.

Another object of this invention is to increase the safety of the lithium oxyhalide system.

In accordance with the present invention such improvements result from the addition of a tetraaza-[14]-annulene complex to the cathode.

DESCRIPTION OF THE PREFERRED EMBODIMENTS

Figure 1:
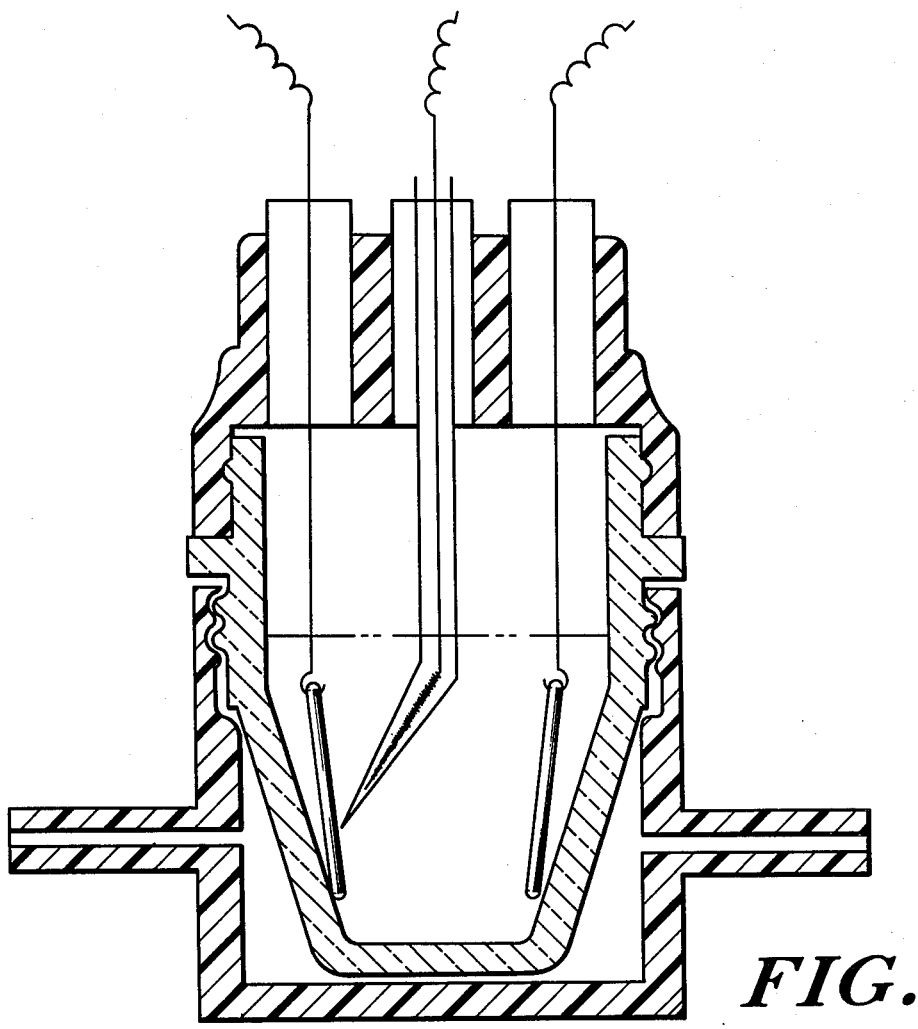
FIG. 1 is a sectional view of a test cell in accordance with the present invention.

A lithium oxyhalide battery having an anode, a non-aqueous electrolyte containing an oxyhalide, and a cathode can be modified to provide a cell having a substantially higher discharge rate, ranging up to ten times higher, and a substantially higher discharge capacity, ranging up to two times higher than similar batteries with uncatalyzed cathodes. The modification is the addition of a metallated tetraaza-[14]-annulene complex to the cathode material. A metallated tetraaza-[14]-annulene complex (TTA) is a compound having the following structural formula where M represents a metal atom:

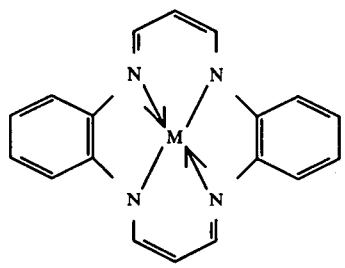

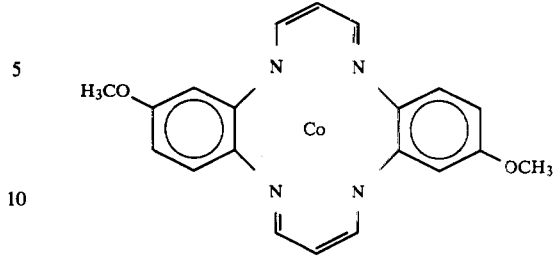

The present invention is applicable to any lithium oxyhalide cell. The term lithium oxyhalide cell is meant to refer to a cell having an anode containing lithium, a nonaqueous electrolyte containing an oxyhalide and a carbon or metal cathode. It is understood that lithium, calcium amalgams thereof, or amalgams of calcium or lithium with cadmium, or mercury may be used for the anode. The carbon used for the cathode can be, for example, untreated or heat treated carbon black, or carbon black with 0 to 50% Teflon (PTFE) added as an inert binder. As used throughout this specification and claims, all percentages are by weight unless specified otherwise. The metal used for the cathode can be, for example, platinum, nickel or stainless steel.

Among the preferred tetraaza-[14]-annulene complexes are those formed by the reaction of one equivalent metal acetate with once molar equivalent of diamine and of aldehyde or dioxoalkane. Preferred reactants are transition metal salts, 1,2-diamino aromatics and propargyl aldehyde. The preferred transition metals are iron and cobalt. The reaction of diamine, an aldehyde, and a transition metal salt (cobalt acetate) to form a metallated tetraaza-[14]-annulene complex is:

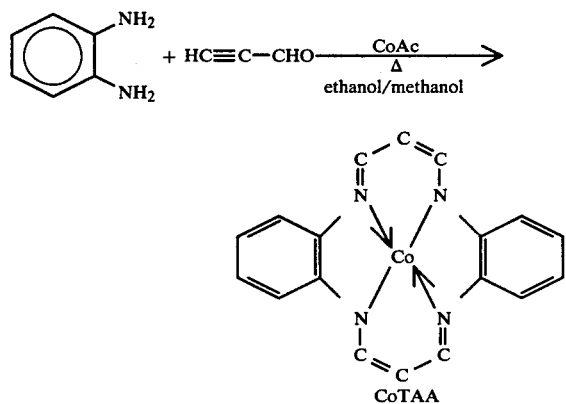

CoTAA

The following examples more fully illustrate the preparation of tetraaza-[14]-annulene complexes.

Cobalt dibenzotetraaza-[14]-annulene is prepared by the reaction of 22 grams of o-phenylenediamine with 11 grams of propargyl aldehyde in a 50% ethanol 50% methanol (volume/volume) mixture followed by addition of 20 grams of cobalt acetate in 75 milliliters of methanol. The mixture is refluxed twelve hours, cooled, filtered, and the precipitated complex washed with cold ethanol.

4-methoxyphenylenediamine can be substituted for the o-phenylene diamine to make cobalt 4,4'-dimethoxydibenzotetraaza-[14]-annulene:

2,4-pentanedione can be substituted for propargyl aldehyde to make cobalt dibenzo-2,4,9,11-tetramethyltetraaza-[14]-annulene.

Iron dibenzotetraaza-[14]-annulene can be prepared by substituting 27.9 grams ferrous sulfate for the cobalt acetate.

Other forms of tetraaza-[14]-annulene complexes may have substituted benzene rings or "bridgehead carbons". The latter "bridge" the benzene-bound nitrogens.

$H_2$ may be substituted for the metal center of the tetraaza-[14]-annulene complex, although the catalytic activity is lower.

The addition of a tetraaza-[14]-annulene complex to the cathode matrix may be satisfactorily accomplished by a number of methods, including simple physical mixing, physical mixing followed by heating in an oven, and solvent deposition. For example, solvent deposition is used to adsorb catalyst to metal cathodes.

In another example, 250 milligrams of iron dibenzotetraaza-[14]-annulene is mixed with 500 milligrams of Vulcan XC-72R carbon and heated to 900° in an argon atmosphere for two hours. Heating between 500° and 1000° C. in an inert atmosphere for two hours sufficiently fixes the catalyst to the carbon. Still another example is the physical mixing of 0.55 grams of cobalt dibenzotetraaza-[14]-annulene with 4.95 grams of Shawinigan Acetylene Black. A third example of a method to prepare catalyzed carbon is to dissolve 10 milligram cobalt dibenzotetraaza-[14]-annulene in 50 milliliters of dimethylformamide heated to reflux and add one gram of Shawinigan Acetylene Black carbon. The refluxing solvent must contain less than one percent of the complex due to the limited solubility of the complex.

Carbon with attached tetraaza-[14]-annule complex is harvested by filtration and washed with methanol and diethyl ether.

Cathodes may be prepared from the catalyst-fixed carbon in the following way:

75 milligrams of carbon containing iron dibenzotetraaza-[14]-annulene is mixed with a 50 milliliter aqueous dispersion of 4 milligrams of polytetrafluoroethylene (PTFE). The solids are flocced using 0.01M $LaSO_4$ and pH adjustment then filtered into a thin carbon support. Excess water is removed with blotting paper and a metal screen with a current collector is pressed into the face of the electrode. The surfactant is removed by drying at 100° C. for two hours then the PTFE is sintered by heating at 325° C. under a nitrogen atmosphere for five minutes. This procedure yields a cathode with a carbon load of 15 $mg/cm^2$ and a thickness of 0.020 inch.

Tetraaza-[14]-annulene complexes are stable and electrochemically active. Thus, they can be routinely used to significantly improve the energy and power densities of a lithium oxyhalide battery and simultaneously improve the safety and reliability of this type of battery.

The advantages of the present invention are further illustrated by the following non-limiting examples.

EXAMPLE 1

The effect of loading of tetraaza-[14]-annulene complex physically mixed with the carbon on the cathode performance is shown in Table I. The cathodes were based on a carbon black, obtained from the Shawinigan Corp., known as Shawinigan Acetylene Black, physically mixed with the catalyst, that had been heat-treated for one hour at 950° C. under argon. This carbon black contained cobalt dibenzotetraaza-[14]-annulene at levels of 0% to 33% by weight. There appears to be an optimum catalyst loading at approximately 10% catalyst. Higher catalyst loadings negatively affect performance probably because the catalyst is non-conductive and increased loadings may increase ohmic overpotential. Tests were conducted in the test cell of FIG. 1. No overheating or explosion was observed in cells containing the catalyst.

TABLE I

| Catalyst, % | Load, MA/CM$^2$: | Cathode Performance*, V | | |
|---|---|---|---|---|
| | | 10 | 50 | 100 |
| 0 | | 3.320 | 3.195 | 3.090 |
| 1 | | 3.355 | 3.233 | 3.115 |
| 5 | | 3.470 | 3.235 | — |
| 10 | | 3.515 | 3.468 | 3.420 |
| 20 | | 3.494 | 3.338 | — |
| 33 | | 3.443 | 3.383 | 3.330 |

*Cathode Performance measured vs. Li reference (IR-free)

EXAMPLE 2

The effect that tetraaza-[14]-annulene catalyst loading has on cathode capacity is shown in Table II. The cathodes were based on the same carbon black obtained from the Shawinigan Corp. as in Example 1. This carbon black also contained cobalt dibenzotetraaza-[14]-annulene at levels of 0% to 33% by weight. Varying the catalyst load does not appear to affect cathode capacity. Both power and energy densities are increased based on the observed increase in average cell voltage (voltage at 50% depth of discharge) at catalyst loads over 10%. No overheating or explosion was observed in the cells containing the catalyst.

TABLE II

| Catalyst, % | Average Cell Voltage$^1$, V | Discharge Time$^2$, Min. |
|---|---|---|
| 1 | 3.30 | 58 |
| 10 | 3.41 | 58 |
| 33 | 3.42 | 58 |

$^1$Cathode voltage vs. Li reference at 50% depth of discharge.
$^2$Time at 20 MA/CM$^2$ to cut-off voltage of 2.5V.

EXAMPLE 3

Figure 2:
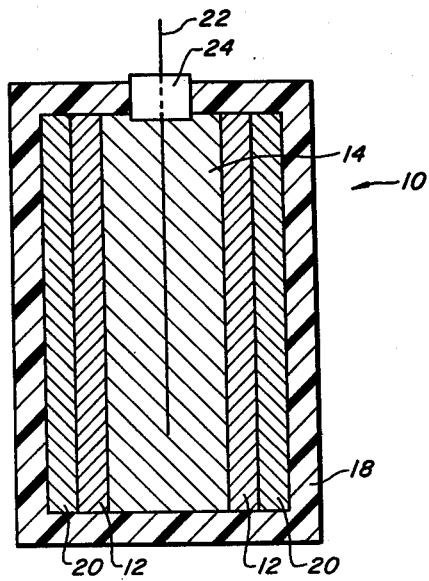
FIG. 2 is a schematic diagram of a "½AA" bobbin type lithium oxyhalide battery incorporating the present invention; and, FIG. 3 depicts a plot of cell voltage vs. time of a cell of the invention and a conventional cell.
Figure 3:
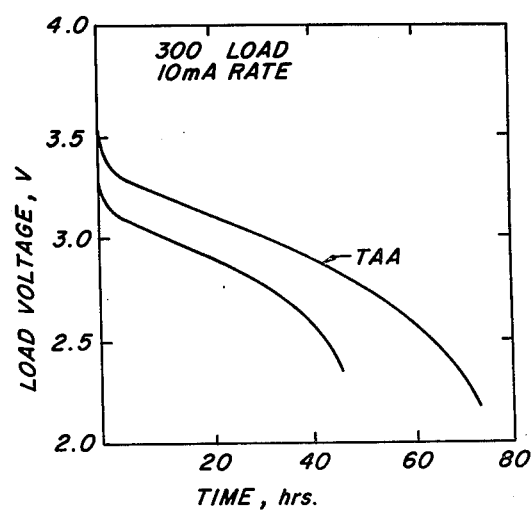

A "½AA" size bobbin-type battery 10, as shown in FIG. 2, with a lithium anode 12, and a carbon cathode wetted with thionyl chloride in 1.8M LiAlCl$_4$ 14, was prepared in a 304 stainless housing 18, 10 mm in diameter and 35 mm long. The anode is insulated from the cathode and oxyhalide/electrolyte salt solution by separator material 20. A cathode current collector 22 is located at one end, insulated from the steel housing by a non-conductive seal 24. The cathode contains 5% polytetrafluoroethylene and 10% cobalt dibenzotetraaza-[14]-annulene. A conventional battery was also made using only carbon black mixed with 5% PTFE as the cathode material. FIG. 3 is a comparison of the discharge capacity of the two batteries at room temperature against a constant load of 300 ohms. The battery of the invention (curve labeled TAA) is shown to have 50% more capacity to a cut-off voltage of 2.50 V.

The invention has been described with reference to its preferred embodiment, other embodiments can achieve the same results. Variations and modifications of the present invention will be obvious to those skilled in the art and it is intended to cover in the appended claims all such modifications and equivalent as follows in the true spirit and scope of this invention.

What is claimed is:

1. In an oxyhalide cell having an anode, a non-aqueous electrolyte containing an oxyhalide and an electrolyte salt, and a cathode, wherein the improvement comprises the addition of a tetraaza-[14]-annulene complex to the cathode.

2. The oxyhalide cell of claim 1 wherein the anode contains an element selected from the group consisting of lithium, calcium mixtures thereof, the amalgams of lithium or calcium with mercury, or cadmium.

3. The cell of claim 2 wherein the anode contains lithium.

4. The oxyhalide cell of claim 3 wherein the oxyhalide is selected from the group consisting of thionyl chloride, sulfuryl chloride and phosphorus oxychloride.

5. The oxyhalide cell of claim 4 wherein the cathode is metal or carbon.

6. The oxyhalide cell of claim 5 wherein the metal is selected from the group consisting of platinum, nickel and stainless steel.

7. The oxyhalide cell of claim 1 wherein the tetraaza-[14]-annulene complex is made from the reaction of 1,2-diamino aromatics with 1,3-dioxoalkanes.

8. The oxyhalide cell of claim 1 wherein the tetraaza-[14]-annulene complex is a transition metal complex of dibenzotetraaza-[14]-annulene.

9. The oxyhalide cell of claim 8 wherein the transition metal is selected from the group consisting of iron and cobalt.

10. The oxyhalide cell of claim 1 wherein the tetraaza-[14]-annulene complex is added to the cathode by physical mixing.

11. The oxyhalide cell of claim 1 wherein the tetraaza-[14]-annulene complex is covalently bonded to the cathode via an alkyl chain.

12. The oxyhalide cell of claim 1 wherein the tetraaza-[14]-annulene complex is added to the cathode by means of adsorption from or evaporation of a solvent.

13. The oxyhalide cell of claim 10 wherein the cathode is heat treated.

14. The oxyhalide cell of claim 1 wherein the tetraaza-[14]-annulene complex is from 1 to 10 weight percent of the cathode.

15. The oxyhalide cell of claim 13 wherein the tetraaza-[14]-annulene complex is 10 weight percent of the cathode.

* * * * *